(12) United States Patent
Vastmans et al.

(10) Patent No.: US 9,985,723 B2
(45) Date of Patent: May 29, 2018

(54) FIBER OPTIC CABINET AND NETWORK SYSTEM WITH BACK-UP CONNECTIVITY

(71) Applicant: CommScope Connectivity Belgium BVBA, Kessel-Lo (BE)

(72) Inventors: Kristof Vastmans, Boutersem (BE); Johan Geens, Bunsbeek (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 117 days.

(21) Appl. No.: 15/116,700

(22) PCT Filed: Feb. 3, 2015

(86) PCT No.: PCT/EP2015/052137
§ 371 (c)(1),
(2) Date: Aug. 4, 2016

(87) PCT Pub. No.: WO2015/117935
PCT Pub. Date: Aug. 13, 2015

(65) Prior Publication Data
US 2016/0352417 A1 Dec. 1, 2016

Related U.S. Application Data

(60) Provisional application No. 61/935,692, filed on Feb. 4, 2014.

(51) Int. Cl.
*G02F 1/00* (2006.01)
*H04B 10/03* (2013.01)
(Continued)

(52) U.S. Cl.
CPC ........... *H04B 10/03* (2013.01); *G02B 6/3562* (2013.01); *G02B 6/4452* (2013.01);
(Continued)

(58) Field of Classification Search
CPC .... H04B 10/03; H04B 10/2504; H04B 10/27; G02B 6/3562; G02B 6/4452;
(Continued)

(56) References Cited

U.S. PATENT DOCUMENTS 7,333,707 B2 * 2/2008 Puetz .................. G02B 6/4452
385/135
9,049,500 B2 * 6/2015 Conner ................. H04B 10/27
(Continued)

FOREIGN PATENT DOCUMENTS

WO 2004086112 A1 10/2004
WO 2011134039 A1 11/2011

OTHER PUBLICATIONS

International Search Report and Written Opinion for PCT/EP2015/052137 dated Apr. 23, 2015 (10 pages).

*Primary Examiner* — M. R. Sedighian
(74) *Attorney, Agent, or Firm* — Merchant & Gould P.C.

(57) ABSTRACT

A fiber optic network (10) includes a mobile switching center (MSC) (12) which distributes fiber optic signals to one or more remote cabinets (40, 42, 44). The remote cabinets (40, 42, 44) distribute signals to one or more customers. The cabinets (40, 42, 44) receive service from the MSC (12) or from a temporary service provider, such as a vehicle (500), in the event of a catastrophic failure of the MSC (12). The cabinets (40, 42, 44) include equipment which allows patching to a temporary service provider through a patch panel (200), and sub-racks (154, 156, 158) and supporting cabling (134, 136) to provide service to each of the cabinets in the network.

9 Claims, 11 Drawing Sheets

(51) Int. Cl.
*G02B 6/44* (2006.01)
*G02B 6/35* (2006.01)
*H04B 10/25* (2013.01)
*H04B 10/27* (2013.01)
*H04Q 11/00* (2006.01)

(52) U.S. Cl.
CPC ......... *H04B 10/2504* (2013.01); *H04B 10/27* (2013.01); *H04Q 11/0005* (2013.01); *H04Q 11/0062* (2013.01); *H04Q 2011/0043* (2013.01); *H04Q 2011/0081* (2013.01)

(58) Field of Classification Search
CPC ........... H04Q 11/0005; H04Q 11/0062; H04Q 2011/0043; H04Q 2011/0081
See application file for complete search history.

(56) References Cited

U.S. PATENT DOCUMENTS

2008/0219634 A1* 9/2008 Rapp .................... G02B 6/4452
385/135
2009/0245743 A1* 10/2009 Cote .................... G02B 6/4452
385/135

* cited by examiner

FIBER OPTIC CABINET AND NETWORK SYSTEM WITH BACK-UP CONNECTIVITY

CROSS-REFERENCE TO RELATED APPLICATION(S)

This application is a National Stage of PCT/EP2015/051237, filed on 3 Feb. 2015, which claims benefit of U.S. Patent Application Ser. No. 61/935,692 filed on Feb. 4, 2014 and which applications are incorporated herein by reference. To the extent appropriate, a claim of priority is made to each of the above disclosed applications.

BACKGROUND

The present invention concerns fiber optic networks. There is a continuing need to provide service in the event of a failure of a service providing center, such as a central office.

SUMMARY

One aspect of the present invention relates to a fiber optic network including a central office or a mobile switching center which provides service to remote cabinets via cabling. The remote cabinets are connected to homes, businesses, or other premises with various cables. In the event the central office incurs a failure, a mobile central office or mobile switching center in the form of a vehicle can be used to deploy new service through one of the remote cabinets which provides service to the premises served by that cabinet, and to other cabinets in the network.

In one aspect of the invention, equipment is provided in each of the cabinets to receive service from a secondary source through cabling, and provide that secondary source through cabling to the premises served by that cabinet, or to provide service to other cabinets, thereby maintaining service in the network. The mobile switching center in the form of a vehicle can be utilized while the central office or mobile switching center is repaired.

DETAILED DESCRIPTION

Various fiber optic networks include a central office which serves remote customers via fiber optic cables. The cables from the central office are linked to remote equipment which further distributes the fiber optic service to the remote customers. Hubs or cabinets can be used to connect customers to the central office. In some situations, the central office can become disabled or fail due to a catastrophic event. In such a situation, a back up system is provided to continue service to the customers connected to the central office. In some situations, the central office may also be referred to as a mobile switching center.

Referring now to the figures, a fiber optic network 10 includes a Mobile Switching Center (MSC) 12 which distributes fiber optic signals to one or more remote cabinets 40, 42, 44. The remote cabinets 40, 42, 44 distribute signals to one or more manholes 60, 62, 64. Manholes 60, 62, 64 include a terminal for receiving feeder cables and distribution cables 144. The manholes 60, 62, 64 serve individual premises such as businesses or homes 80, 82, 84. Network 10 shows three example remote cabinets 40, 42, 44, three manholes 60, 62, 64, and three businesses or homes 80, 82, 84. Network 10 can include more cabinets, manholes, and businesses or homes as desired.

Feeder cables 100 feed signals from MSC 12 to each of cabinets 40, 42, 44. Distribution cables 120 extend from cabinets 40, 42, 44 to serve manholes 60, 62, 64.

Disposed within each of cabinets 40, 42, 44 are sub-racks 150, 152 which are connected by patch cables 130 thereby connecting the feeder cables 100 to the distribution cables 120.

Should a problem arise with signal delivery by the MSC 12, a back-up network is provided. For example, MSC 12 may be damaged due to a fire, an explosion or other catastrophic event that prevents MSC 12 from providing and receiving signals. In case of damage to MSC 12, a vehicle, such as a truck, can provide temporary service to network 10. Access for the feeder cables into network 10 is through a patch panel 200 located one of cabinets 40, 42, 44. In the example shown, patch panel 200 is shown on cabinet 40. Patch panel 200 connects to sub-racks 154 which deliver signals to sub-racks 152 with patch cables 138 in order to serve manholes 60 connected to cabinet 40. Sub-racks 154 also deliver signals to sub-racks 156 in cabinet 40 with patch cables 132. Sub-racks 156 are connected by cables 134, 134 to cabinets 42, 44 to provide feeder signals to these cabinets. Sub-racks 158 in cabinets 42, 44 receive feeder signals from cabinet 40. Patch cables 138, 140 connect sub-racks 158 to sub-racks 152 for delivery of signals to their respective manholes 62, 64 connected to cabinets 42, 44.

In this manner, the MSC 12 can be repaired, while signals can be delivered to the customers by accessing a feeder input at cabinet 40 at patch panel 200.

Patch panel 200 can be an external patch panel which uses hardened fiber optic cables which have improved resistance to water, dust, and other environmental conditions. By using an external patch panel 200, access to an interior of cabinet 40 is not needed except for routing of the internal patch cords, as needed. In one example, multi-fiber hardened connectors are used. See an example OPTI-TIP hardened connector by Corning and U.S. Pat. No. 7,264,402. Within sub-racks 154, the multi-fiber cables 300 are fanned out into individual fibers at cassettes 400.

Back-up cables 140, 142 can be provided should cables 134, 136 fail. Back-up sub-racks 170, 172 connect to back-up cables 140, 142.

Figure 1:
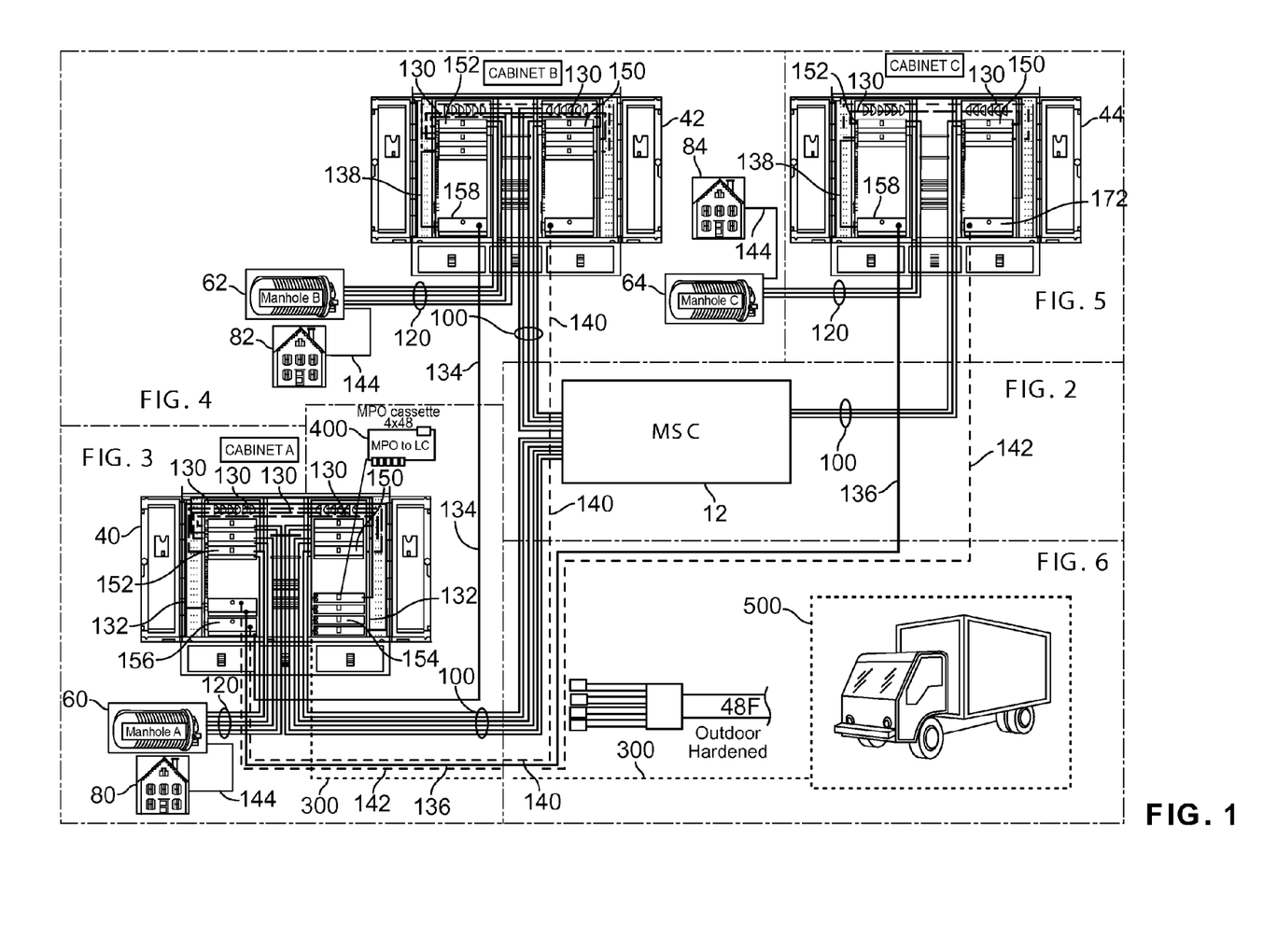
FIG. 1 is a schematic representation of a fiber optic network in accordance with the present invention.
Figure 2:
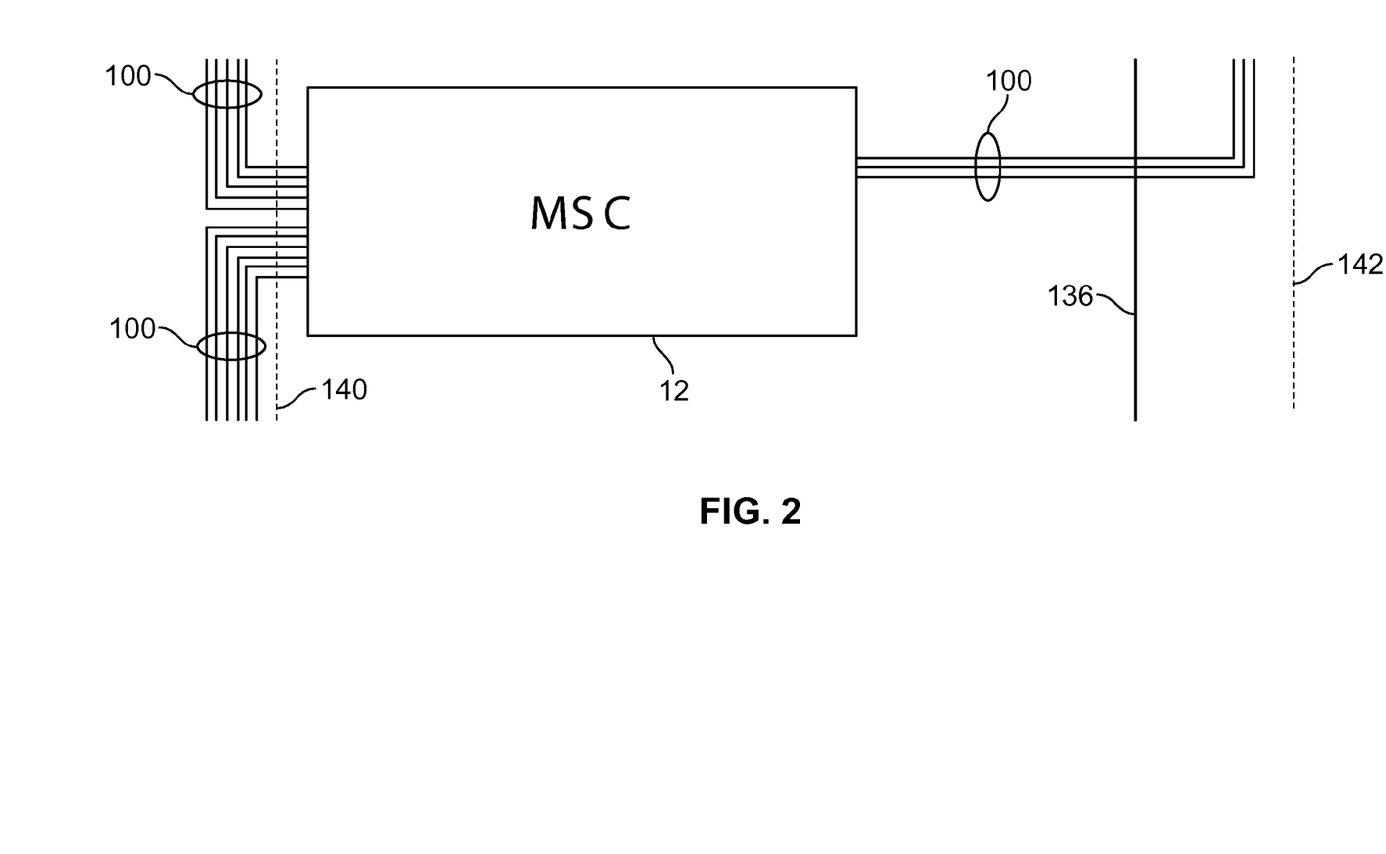
FIGS. 2 through 6 show in enlarged views different portions of the network of FIG. 1.
Figure 3:
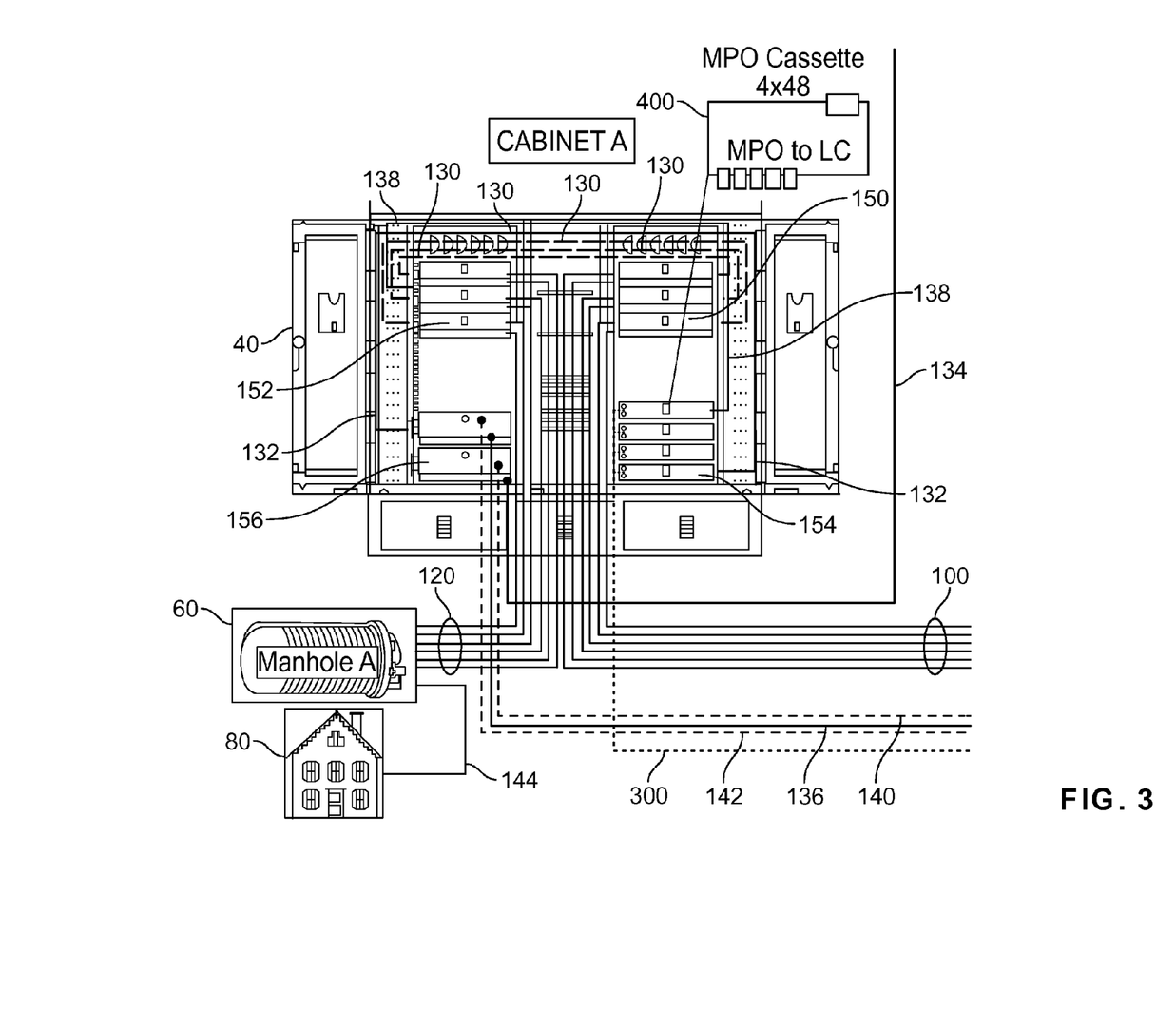
Figure 4:
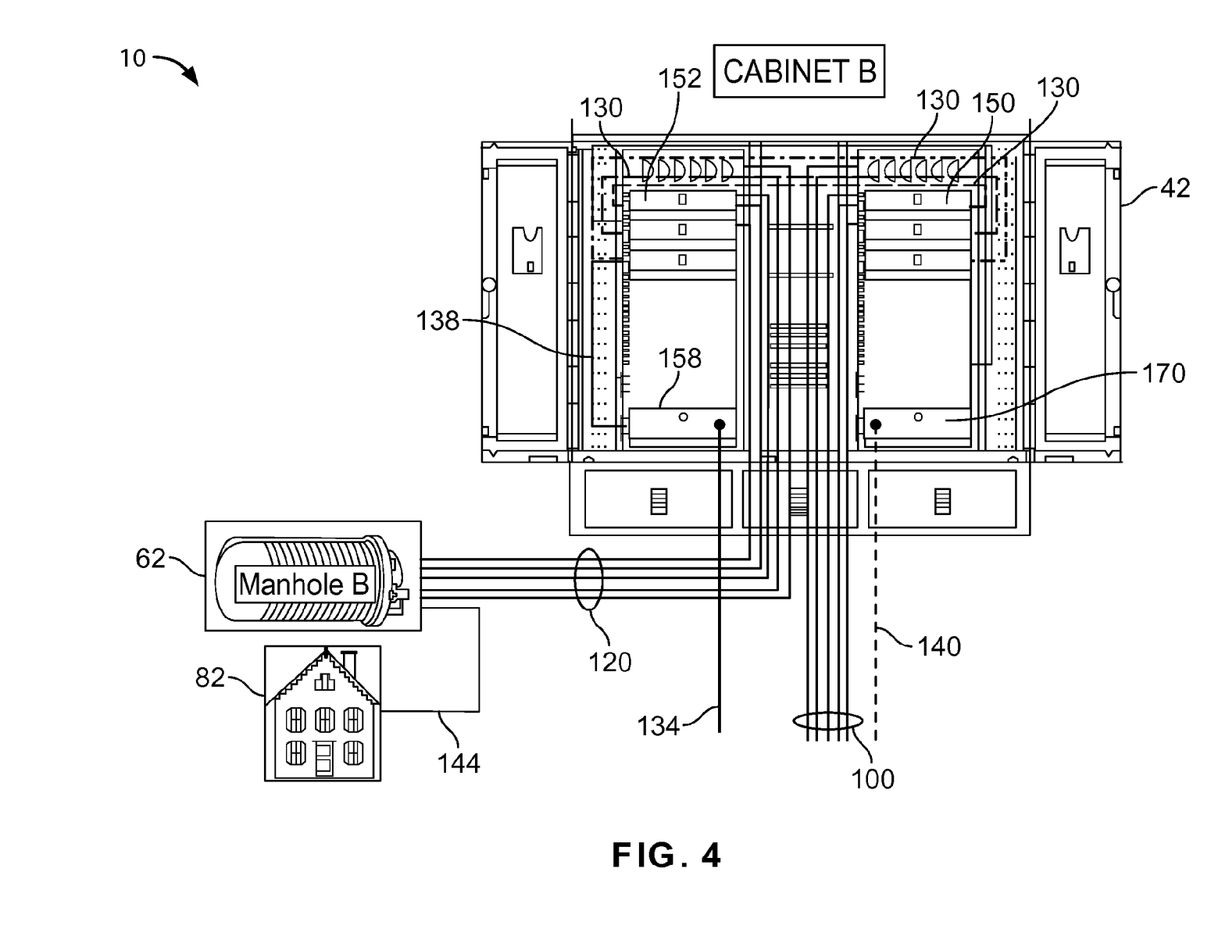
Figure 5:
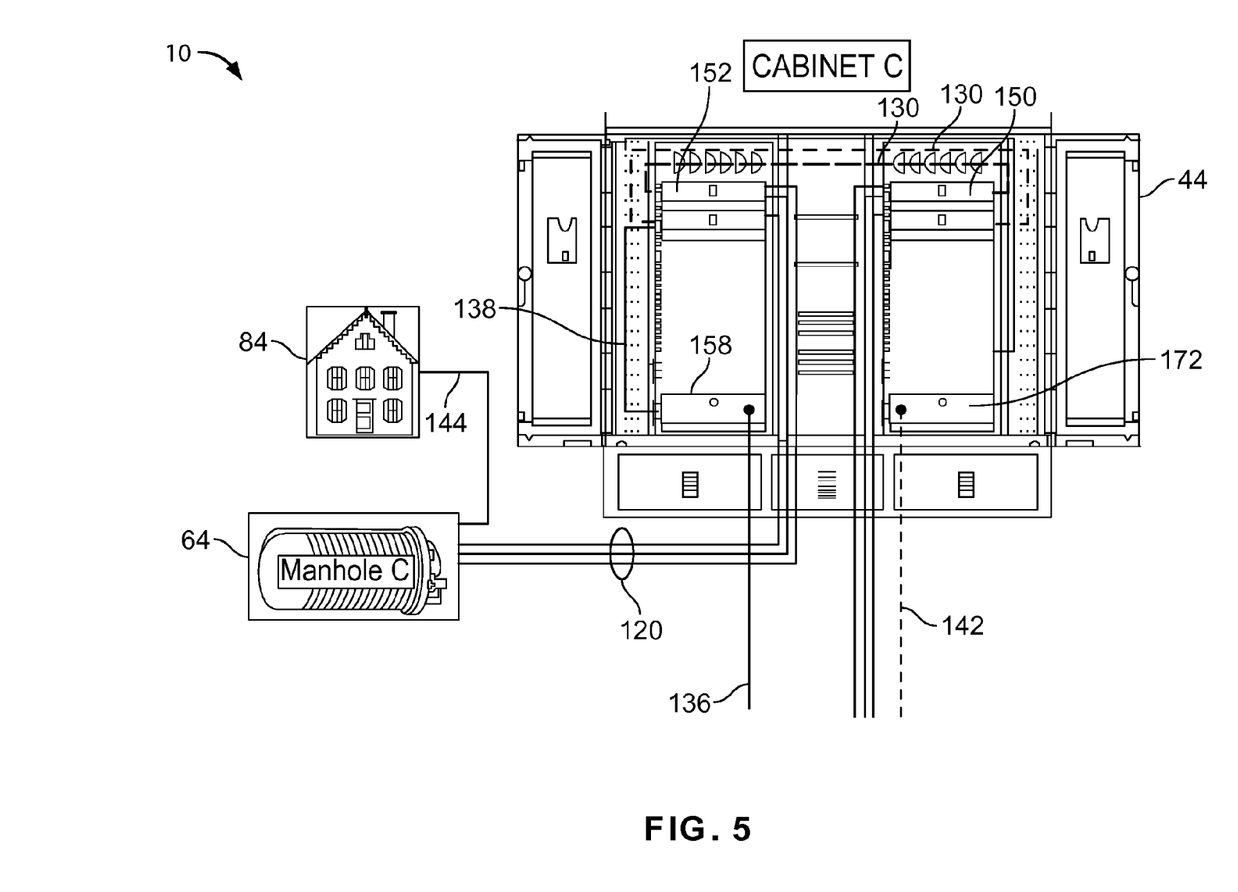
Figure 6:
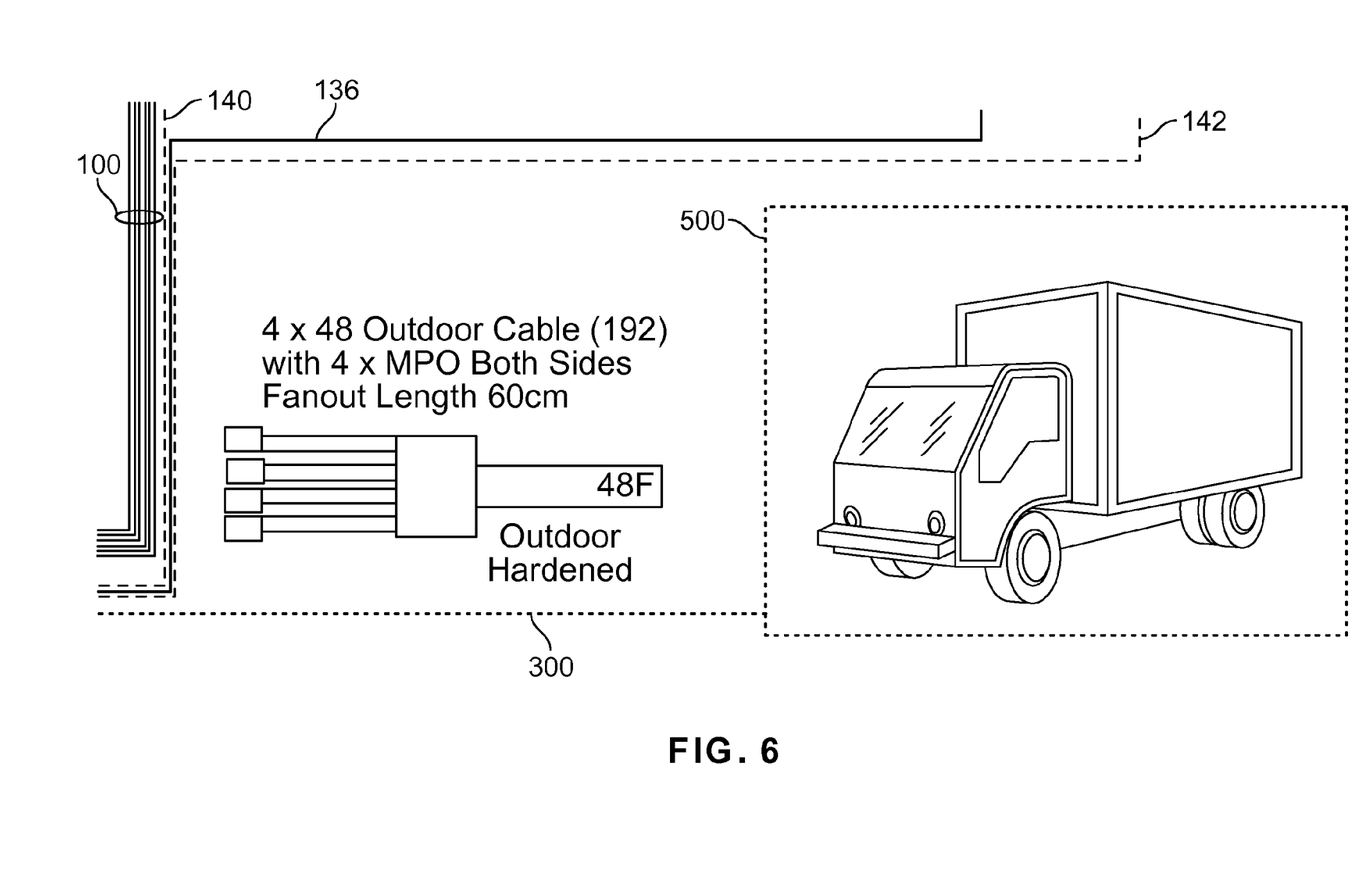
Figure 7:
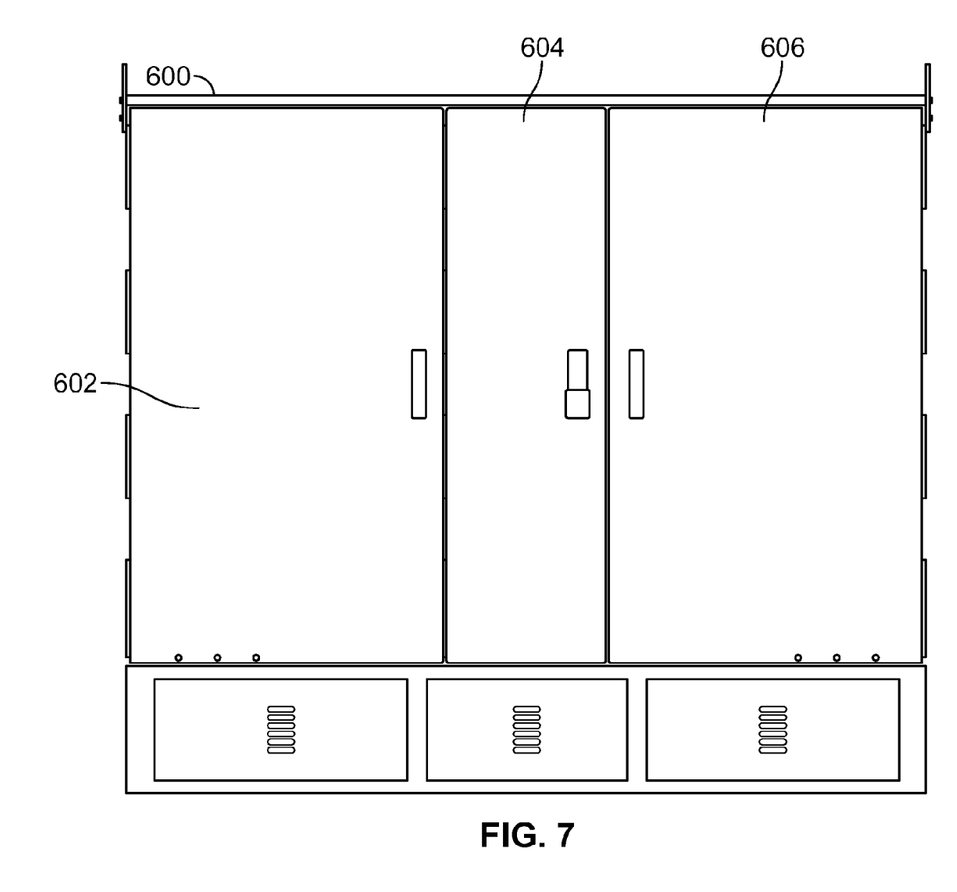
FIG. 7 is a front view of an example cabinet.
Figure 8:
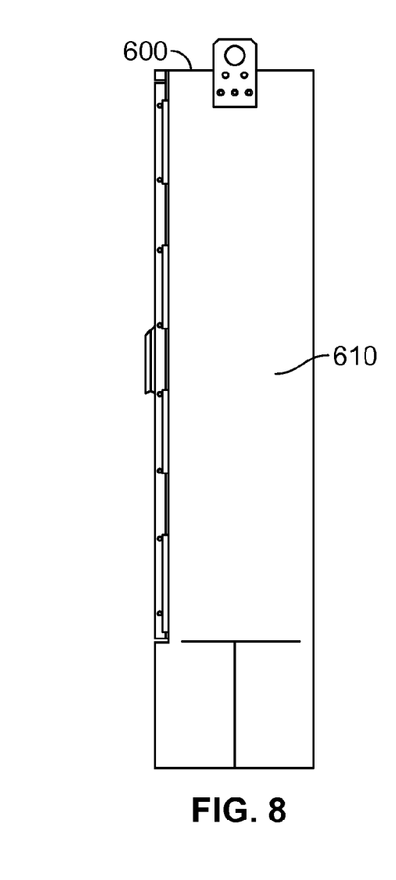
FIG. 8 is a side view of the cabinet of FIG. 7.
Figure 9:
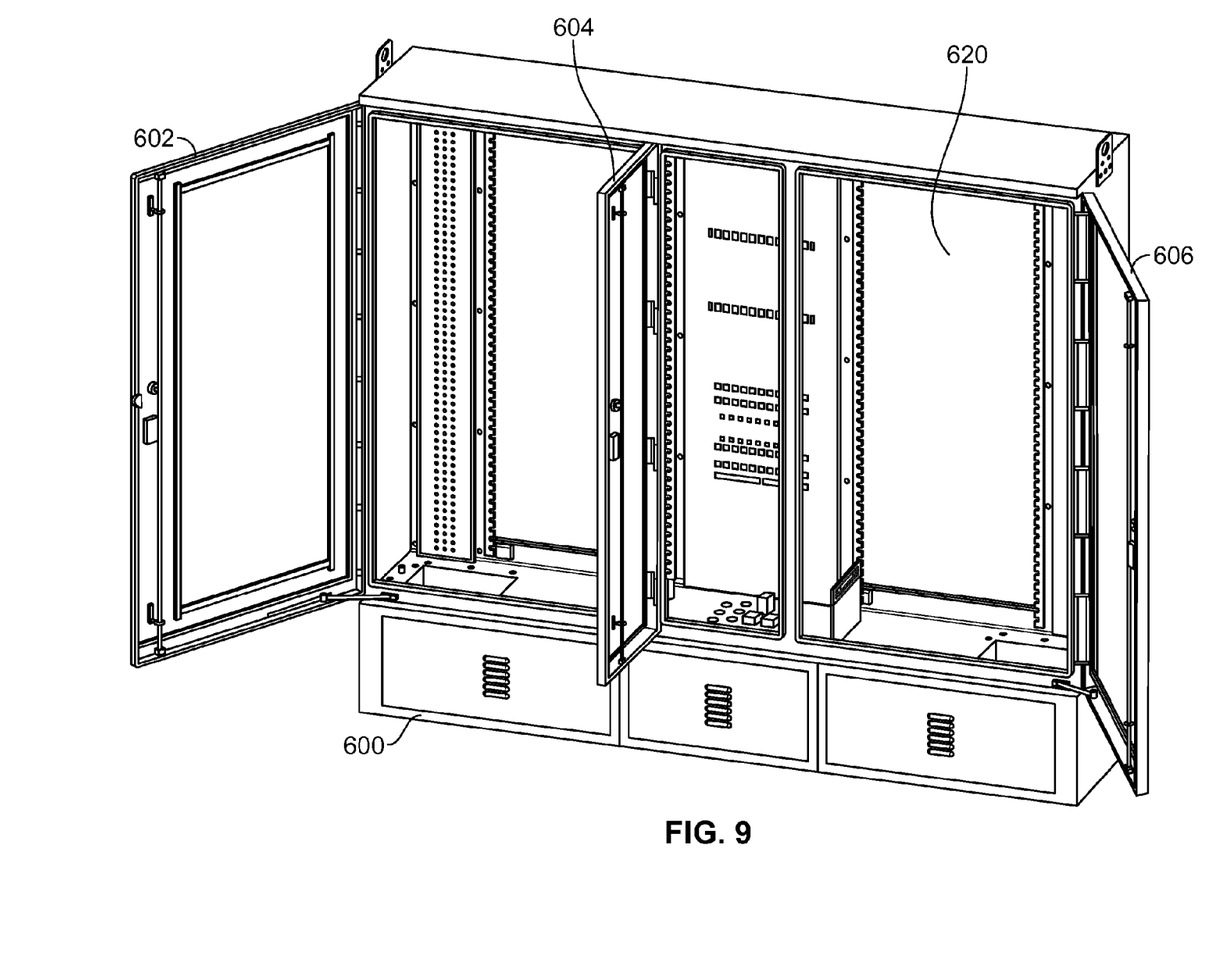
FIG. 9 is a perspective view of the cabinet of FIG. 7, showing various doors in the open position to access an interior of the cabinet.
Figure 10:
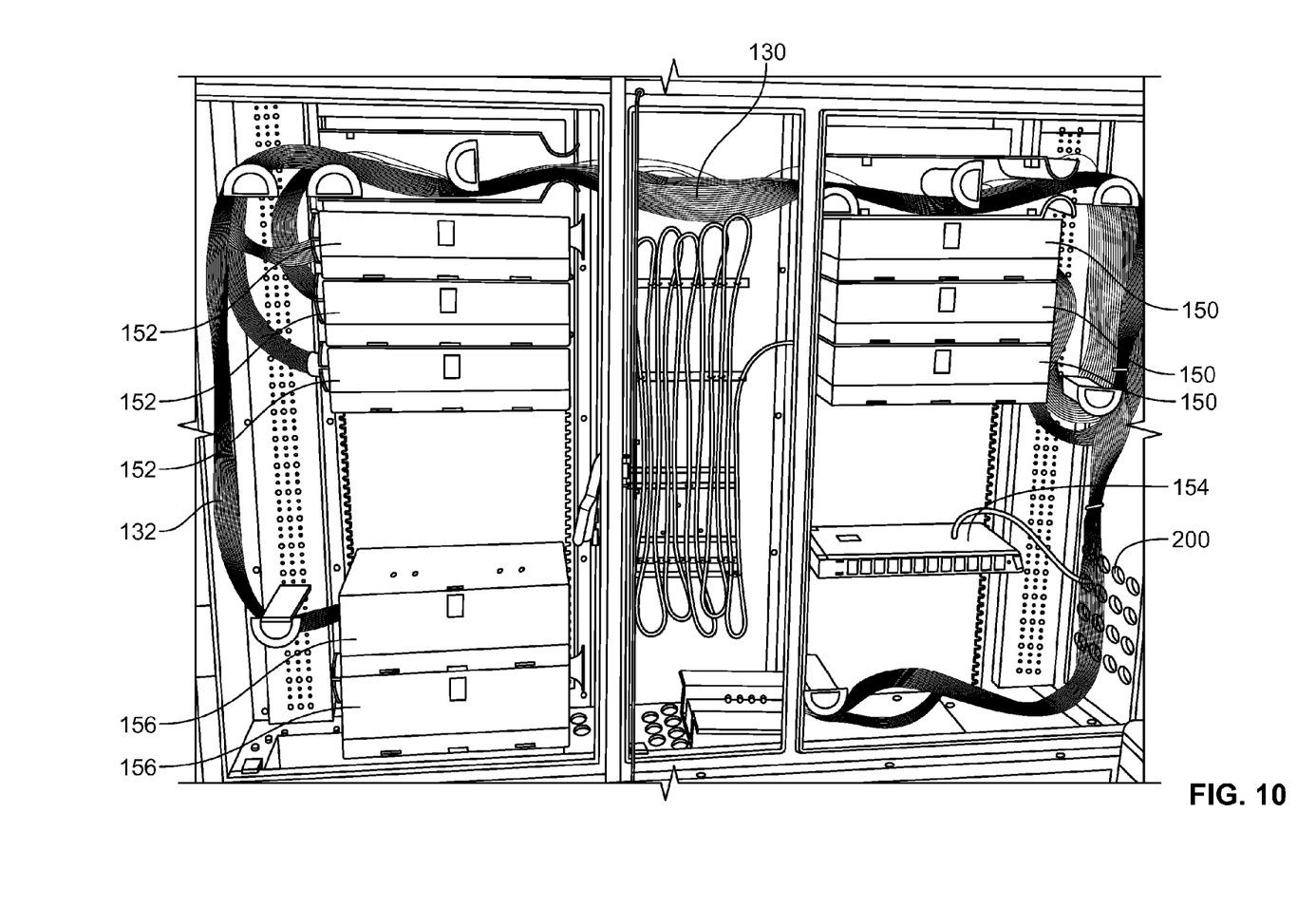
FIG. 10 is a front view of the cabinet showing the cabinet populated with various equipment including an exteriorly accessible patch panel.
Figure 11:
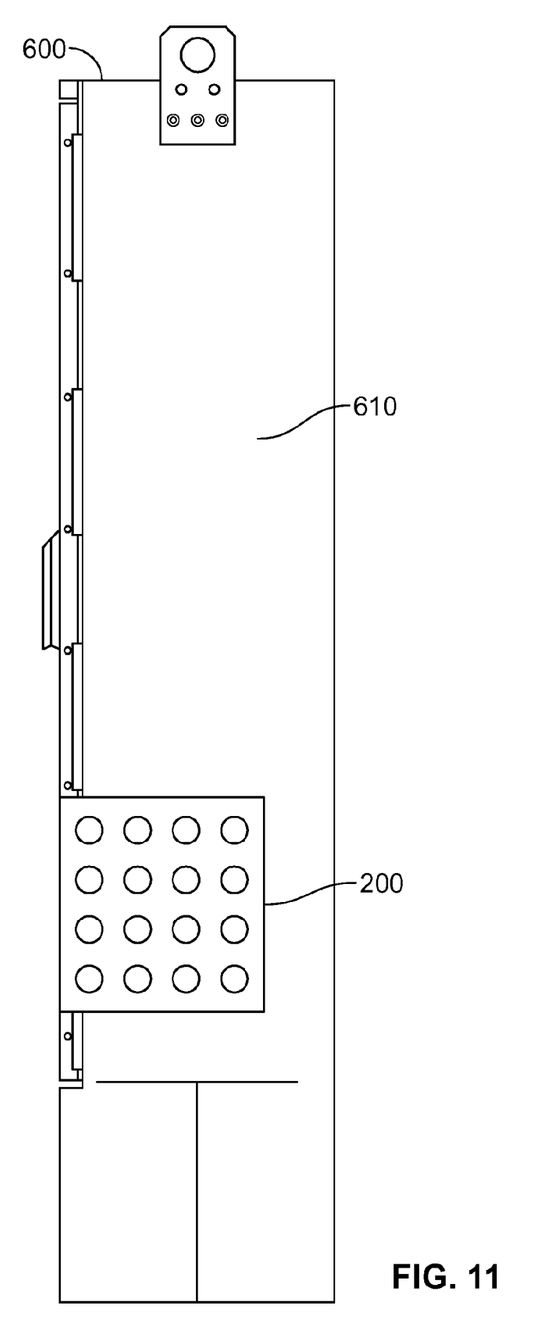
FIG. 11 is a side view of the cabinet of FIG. 10 showing the exteriorly accessible patch panel.
Figure 12:
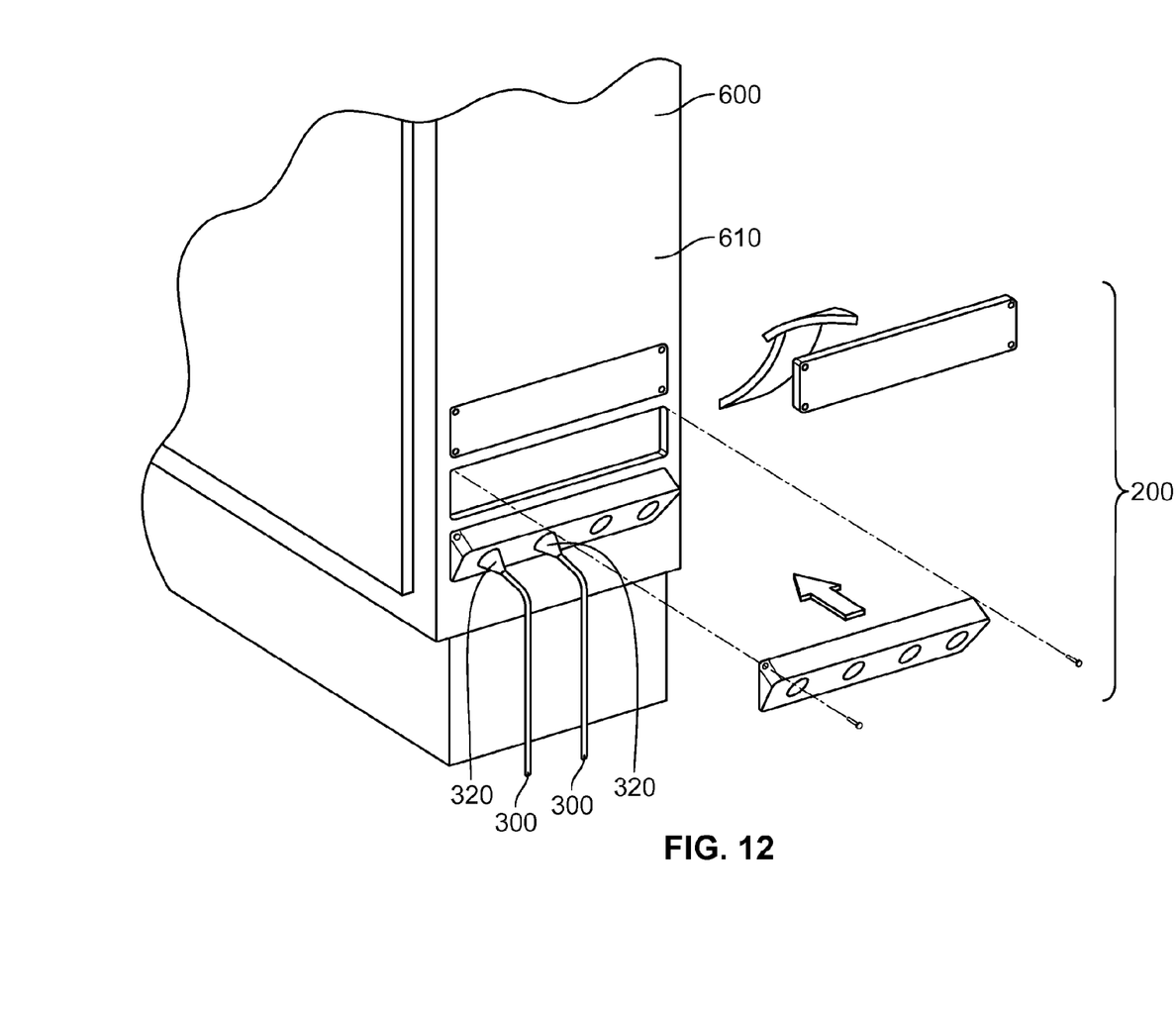
FIG. 12 is a perspective view showing further details of a patch panel on a side of a cabinet, in one example embodiment.

Referring now to FIGS. 7 through 12, further examples of cabinets 40, 42, 44 are shown. Each of the cabinets includes an enclosure 600. Doors 602, 604, 606 are used to access an interior 620 of each cabinet. Interior 620 is where the various equipment for connecting the customers to the MSC 12 are housed. The interior 620 is also the location of the various patch cables which connect the different pieces of equipment to enable connection from the MSC 12 to the customers, or the vehicle 500 to the customers.

When back-up service is desired, such as due to a failure of the MSC 12, patch cords are used within each cabinet 40, 42, 44 to connect the sub-racks 154, 156, 158 to the various customers. It is to be appreciated that the various patch cables used during back-up service can be the same ones used under normal service from the MSC 12, or they can be different, especially if different lengths are needed.

The various sub-racks 150, 152, 154, 156, 158, 170, 172 can include telecommunications equipment for connecting fiber optic cables. In one embodiment, the sub-racks can contain splices. In the case of sub-racks 154, fan-outs can be provided for accepting a multi-fiber feeder cable and splitting the cable into individual single fiber cables. In one example, a multi-fiber to single fiber cassette 400 in sub-rack 154 can be provided. An appropriate number of cassettes 400 are utilized depending on how many input and output cables are desired. The various cables 100, 120, 134, 136, 140, 142 can be multi-fiber cables, as desired.

In some situations, not all of the customers connected to the MSC 12 are connected during the back-up service provided by vehicle 500. There are situations in which only a certain percentage of the customers are connected to the back-up service. In such situations, priority may be given to certain customers or premises in which service is in high demand or for critical needs. This may reduce the number of patchings needed in each of cabinets 40, 42, 44 during the back-up service. However, it is to be appreciated that all of the customers can be connected if desired through the back-up service.

LIST OF REFERENCE NUMERALS AND CORRESPONDING FEATURES

10 Fiber optic network
12 MSC
40 Cabinet
42 Cabinet
44 Cabinet
60 Manhole
62 Manhole
64 Manhole
80 Home
82 Home
84 Home
100 Feeder cables
120 Distribution cables
130 Patch cables
132 Patch cables
134 Cables
136 Cables
138 Patch cables
140 Back-up cables
142 Back-up cables
144 Drop cables
150 Sub-racks
152 Sub-racks
154 Sub-racks
156 Sub-racks
158 Sub-racks
170 Back-up sub-racks
172 Back-up sub-racks
200 External patch panel
300 Multi-fiber cables
400 Cassettes
500 Truck
600 Cabinet enclosure
602 Door
604 Door
606 Door
610 Side
620 Interior

What is claimed is:

1. A fiber optic network comprising:
a plurality of cabinets;
an MSC which distributes fiber optic signals to one or more remotely located cabinets, the cabinets providing service to individual premises, such as homes or businesses;
feeder cables which deliver feeder cable signals to each of the cabinets;
distribution cables extending from the cabinets to the premises;
sub-racks disposed within each of cabinets which are connected with patch cables thereby connecting the feeder cables to the distribution cables within each cabinet;
a back-up system, such as a vehicle, which can selectively provide feeder cable signals to network, including:
a patch panel located in or on one of the cabinets for access for the feeder cables into the network;
a sub-rack which connects to patch panel which delivers signals to sub-racks with patch cables in order to serve premises connected to cabinet, wherein the sub-rack also delivers signals to a sub-rack in cabinet, wherein sub-rack is connected with cables to other cabinets to provide feeder signals to these cabinets, wherein a sub-rack in each of these other cabinets receives feeder signals from cabinet;
patch cables connecting sub-racks to sub-racks in the other cabinets for delivery of signals to their respective premises connected to cabinets.

2. A fiber optic network according to claim 1, comprising two cabinets.

3. A fiber optic network according to claim 2, comprising three cabinets.

4. A fiber optic network according to claim 1, wherein the patch panel uses hardened fiber optic connectors.

5. A fiber optic network according to claim 4, wherein the connectors are multi-fiber connectors.

6. A method of using the network of claim 1, wherein use of the back-up system is temporary until the MSC is operational.

7. The network and method of claim 1, wherein further back-up cables are provided for the back-up cables.

8. The network and method of claim 1, wherein the patch cables are the same patch cables as the patch cables connecting the sub-racks.

9. The network and method of claim 1, wherein the patch cables are different patch cables as the patch cables connecting the sub-racks.

\* \* \* \* \*